(12) United States Patent
Scothern

(10) Patent No.: US 10,132,192 B2
(45) Date of Patent: Nov. 20, 2018

(54) SENSOR FAULT DETECTION METHOD

(71) Applicant: ROLLS-ROYCE PLC, London (GB)

(72) Inventor: David P Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 23 days.

(21) Appl. No.: 15/637,000

(22) Filed: Jun. 29, 2017

(65) Prior Publication Data

US 2018/0016935 A1    Jan. 18, 2018

(30) Foreign Application Priority Data

Jul. 13, 2016 (GB) .................................. 1612159.2

(51) Int. Cl.
*F01D 21/00* (2006.01)
*G01K 13/02* (2006.01)
(Continued)

(52) U.S. Cl.
CPC .......... *F01D 21/003* (2013.01); *G01K 13/02* (2013.01); *G01K 15/007* (2013.01); *G01L 27/002* (2013.01); *G01L 27/007* (2013.01); *F05D 2220/32* (2013.01); *F05D 2260/80* (2013.01); *F05D 2270/301* (2013.01);
(Continued)

(58) Field of Classification Search
CPC ...... F01D 21/009; F01D 21/003; F01D 17/02; G01K 13/02; G01K 15/007; G01K 2013/024; G01K 2205/00; G01L 27/002; G01L 27/007; G01L 25/00; G01L 27/005; G01L 13/00; F05D 2270/54; F05D 2270/303; F05D 2270/301; F05D 2260/80;
(Continued)

(56) References Cited

U.S. PATENT DOCUMENTS 7,275,425 B2 * 10/2007 Buck ..................... F02D 41/222
374/E15.001
2006/0137436 A1    6/2006 Buck et al.
(Continued)

FOREIGN PATENT DOCUMENTS

EP    2747038 A1    6/2014
JP    2003-286888 A    10/2003

OTHER PUBLICATIONS

Nov. 22, 2017 Search Report issued in European Patent Application No. 17 17 8723.
(Continued)

*Primary Examiner* — Daniel S Larkin
*Assistant Examiner* — Anthony W Megna Fuentes
(74) *Attorney, Agent, or Firm* — Oliff PLC

(57) ABSTRACT

A method of determining a faulty sensor of a sensor array of a gas turbine engine, the sensor array including at least first, second and third sensors, the method including the steps of: measuring a first set of sensor outputs prior to engine startup from each sensor, and calculating a first difference in the measured value for each sensor pair; after a period of time, measuring a second set of sensor outputs prior to engine startup from each sensor, and calculating a second difference in measured value for each sensor pair; calculating a further difference between the calculated first and second differences for each sensor pair; and identifying a failed sensor where two or more sensor pairs including a common sensor have a further difference above a predetermined threshold.

8 Claims, 3 Drawing Sheets

(51) Int. Cl.
    *G01L 27/00*     (2006.01)
    *G01K 15/00*     (2006.01)

(52) U.S. Cl.
    CPC .... *F05D 2270/303* (2013.01); *F05D 2270/54* (2013.01); *F05D 2270/808* (2013.01); *G01K 2013/024* (2013.01); *G01K 2205/00* (2013.01)

(58) Field of Classification Search
    CPC .......... F05D 2220/32; F05D 2270/808; G01M 15/09; G01M 15/106
    USPC .............. 73/66–767, 114.33–114.34, 112.01, 73/112.03, 1.57, 1.08, 1.15
    See application file for complete search history.

(56) References Cited

U.S. PATENT DOCUMENTS

2012/0130618 A1    5/2012   Bleile et al.
2014/0318209 A1   10/2014   Reimann
2015/0362408 A1   12/2015   Rosendo et al.

OTHER PUBLICATIONS

Dec. 6, 2016 Search Report issued in Great Britain Patent Application No. GB1612159.2.
Merrill, Walter C., "Sensor Failure Detection for Jet Engines", Lewis Research Center, NASA Technical Memorandum 101396, (1988).

\* cited by examiner

SENSOR FAULT DETECTION METHOD

The present disclosure concerns a method of detecting a faulty sensor of a gas turbine engine.

Sensors mounted to gas turbine engines may exhibit a drift in their output prior to failure. Examples of sensors which experience this effect include pressure and temperature sensors. Typically, a plurality of sensors are distributed throughout the engine, and are configured to sense different temperatures and pressures of different regions of the engine in use. Data from these sensors may be used for engine control, and so incorrect sensor readings may result in incorrect engine control, resulting in higher fuel burn or engine damage.

In order to ameliorate this problem, many systems include multiple, redundant sensors. However, determining which sensor has failed or is inaccurate is difficult, especially where all the sensors are of the same type, and so are all susceptible to drift over time. This is particularly difficult where the drift is small, and so the sensor has failed within range. In NASA Technical Memorandum 101396 "Sensor Failure Detection for Jet Engines", 1988, a system in which dual redundant sensors are provided in conjunction with a third, synthesised or estimated measurement is described. First, the dual redundant sensors are compared to determine whether a discrepancy exists. Then a comparison is made to the estimated measurement to isolate the faulty sensor. However, in this method, the estimated measurement must be assumed to be reliable, which may not always be the case. Furthermore, only relatively large discrepancies can be detected. Smaller discrepancies, for example due to sensor drift, cannot generally be detected using existing methods. Furthermore, redundant sensors increase the weight and complexity of the engine.

The present invention seeks to provide a method of determining sensor faults and a sensor fault detection system that overcomes some or all of the above problems.

According to a first aspect of the invention there is provided a method of determining a faulty sensor of a sensor array of a gas turbine engine (10), the sensor array comprising at least first, second and third sensors (A, B, C), the method comprising the steps of:
 (a) measuring a first set of sensor outputs ($S1_A$, $S1_B$, $S1_{3C}$) prior to engine startup from each sensor (A, B, C), and calculating a first difference ($S1_A$-$S1_B$, $S1_A$-$S1_C$, $S1_B$-$S1_C$) in the measured value for each sensor pair (A;B, A;C, B;C);
 (b) after a period of time, measuring a second set of sensor outputs ($S2_A$, $S2_B$, $S2_C$) prior to engine startup from each sensor (A, B, C), and calculating a second difference ($S2_A$-$S2_B$, $S2_A$-$S2_C$, $S2_B$-$S2_C$) in measured value for each sensor pair (A;B, A;C, B;C);
 (c) calculating a further difference (($S1_A$-$S1_B$)-($S2_A$-$S2_B$), ($S1_A$-$S1_C$)-($S2_A$-$S2_C$), ($S1_B$-$S1_C$)-($S2_B$-$S2_C$)) between the calculated first and second differences for each sensor pair (A;B, A;C, B;C); and
 (d) identifying a failed sensor (A, B, C) where two or more sensor pairs (A;B, A;C, B;C) comprising a common sensor have a further difference above a predetermined threshold.

Advantageously, the present invention provides a method of both sensing a fault and determining which sensor is faulty using only three sensors, thereby enabling the remaining sensors to be used to determine the true value of the sensed parameter.

Each of the first, second and third sensors may comprise a strain gauge transducer, and may be configured to sense one of temperature and pressure. Advantageously, prior to engine startup, all temperatures and pressures of the engine should be substantially equal, irrespective of the location of the sensors. Consequently, this condition can be utilised to determine which of the sensors has drifted relative to the other over time.

Each of the sensors may be redundant sensors configured to sense the same pressure when the engine is running. Alternatively, each of the sensors may be located at a different location on the engine, and configured to sense a different engine pressure or temperature when the engine is running. Each sensor may be located at a different compressor stage and/or turbine stage.

The method may comprise recalibrating the faulty sensor in accordance with the further difference determined in step c.

According to a second aspect of the invention, there is provided a sensor fault detection system of a gas turbine engine, the system comprising:
a sensor array comprising first, second and third pressure and/or temperature sensors (A, B, C); and
a controller configured to:
 (a) measure a first set of sensor outputs ($S1_A$, $S1_B$, $S1_{3C}$) prior to engine startup from each sensor (A, B, C), and calculate a first difference ($S1_A$-$S1_B$, $S1_A$-$S1_C$, $S1_B$-$S1_C$) in the measured value for each sensor pair (A;B, A;C, B;C);
 (b) after a period of time, measure a second set of sensor outputs ($S2_A$, $S2_B$, $S2_C$) prior to engine startup from each sensor (A, B, C), and calculate a second difference ($S2_A$-$S2_B$, $S2_A$-$S2_C$, $S2_B$-$S2_C$) in measured value for each sensor pair (A; B, A;C, B;C);
 (c) calculate a further difference (($S1_A$-$S1_B$)-($S2_A$-$S2_B$), ($S1_A$-$S1_C$)-($S2_A$-$S2_C$), ($S1_B$-$S1_C$)-($S2_B$-$S2_C$)) between the calculated first and second differences for each sensor pair (A;B, A;C, B;C); and
 (d) identify a failed sensor (A, B, C) where two or more sensor pairs (A;B, A;C, B;C) comprising a common sensor have a further difference above a predetermined threshold.

The controller may comprise a FADEC of a gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

An embodiment will now be described by way of example only, with reference to the Figures, in which.

Figure 1:
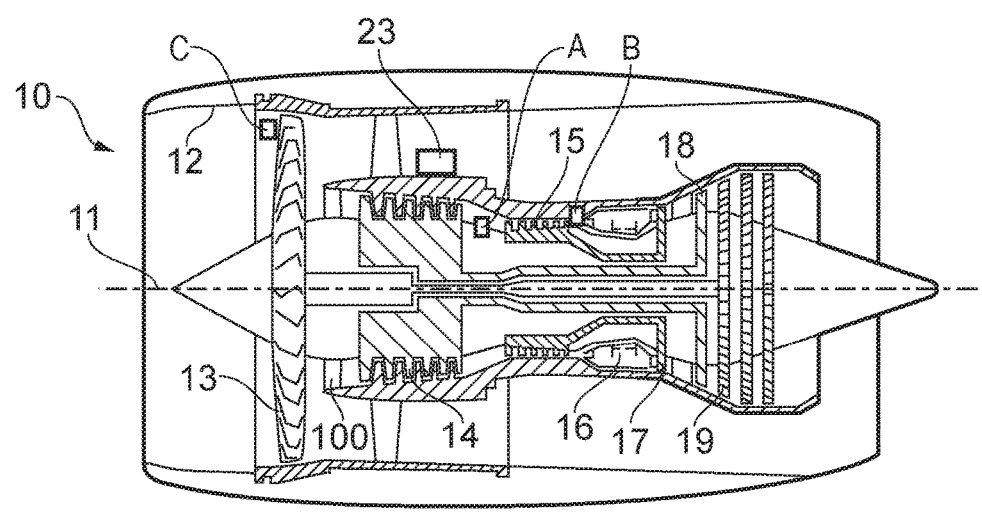
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle. A nacelle generally surrounds the engine 10 and defines both the intake 12 and the exhaust nozzle.

The gas turbine engine 10 works in the conventional manner so that air entering the intake 12 is accelerated by the fan 13 to produce two air flows: a first air flow into the intermediate pressure compressor 14 and a second air flow which passes through a bypass duct to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 3:
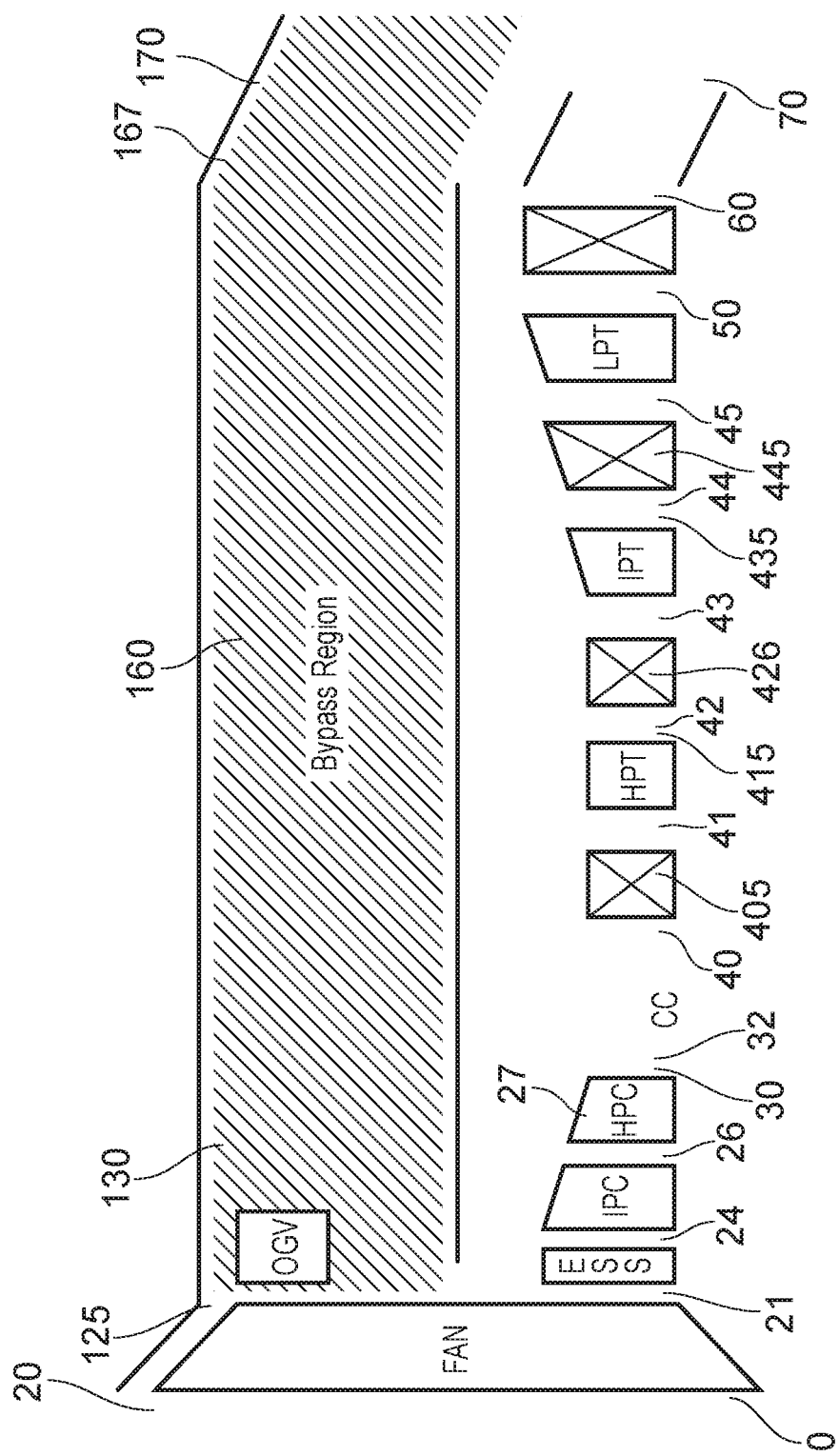
FIG. 3 is a schematic of the gas turbine engine of FIG. 1, showing potential locations of pressure and/or temperature sensors.

It will be appreciated that the temperature and pressure varies considerably throughout the engine 10 in operation. For example, a fan inlet pressure P0 is defined upstream of the fan 13. An intermediate compressor inlet pressure P24 is defined immediately upstream of the intermediate compressor 14 in core engine flow. A high pressure compressor inlet pressure P26 is defined immediately upstream of the high pressure compressor 15. Similarly, a high pressure compressor inlet temperature T26 is defined at the same position. Further engine pressures and temperatures are defined, as shown in FIG. 3.

The engine 10 includes first, second and third pressure sensors A, B, C. Each of the sensors comprises a strain transducer configured to convert a strain produced by atmospheric pressure into an electrical signal. In one example, each sensor comprises a pair of transducers mounted to a common diaphragm. Such a sensor is known as "electrically duplex, mechanically simplex". In the event of damage to the diaphragm, both sensors will tend to drift together, and would therefore pass a cross-check. Where two or more transducers provided, and attached to a single diaphragm, each of these transducers could be regarded by the following method as a single sensor. Alternatively, the outputs of these transducers could be averaged, or subject to other signal processing, and produce a single output, and therefore the combination of two or more transducers could be considered as a single sensor.

Each pressure sensor A, B, C could be co-located, or could be located at a different location on the engine 10. For example, in the presently described embodiment, a first pressure sensor A comprises a pressure sensor located at engine station 26 as shown in FIG. 3, i.e. downstream of the intermediate pressure compressor 14, and upstream of the high pressure compressor 15. A second pressure sensor B comprises a pressure sensor located at engine station 30 as shown in FIG. 3, i.e. downstream of the high pressure compressor 15, and upstream of the combustor 16. A third pressure sensor C is provided upstream of the fan 13 at engine station 0 in FIG. 3. Consequently, the pressure sensors A, B, C are configured to sense different engine pressures when the engine is in operation, i.e. where the compressors 14, 15 and turbines 17, 18, 19 are rotating and compressing and expanding air respectively. Alternatively, the sensors could be provided in the same location, and would therefore represent "triply redundant" sensors, which are configured to sense the same pressure when the engine is in operation. In either case, each pressure sensor A, B, C is in communication with ambient air externally to the engine 10, and so is subject to the same pressure prior to engine start. Once the engine is started, the pressures at different locations will tend to differ.

Each of the pressure sensors A, B, C is in signal communication with an engine controller in the form of a FADEC 23. The FADEC 23 is configured to control engine parameters such as combustor fuel flow and inlet nozzle guide vane (IGV) angles in accordance with, inter alia, signals from each of the sensors A, B, C. Consequently, inaccurate signals from the sensors A, B, C may result in incorrect fuel and IGV angle scheduling, which may in turn result in increased fuel consumption and engine damage due to, for example, compressor stall or surge.

Figure 2:
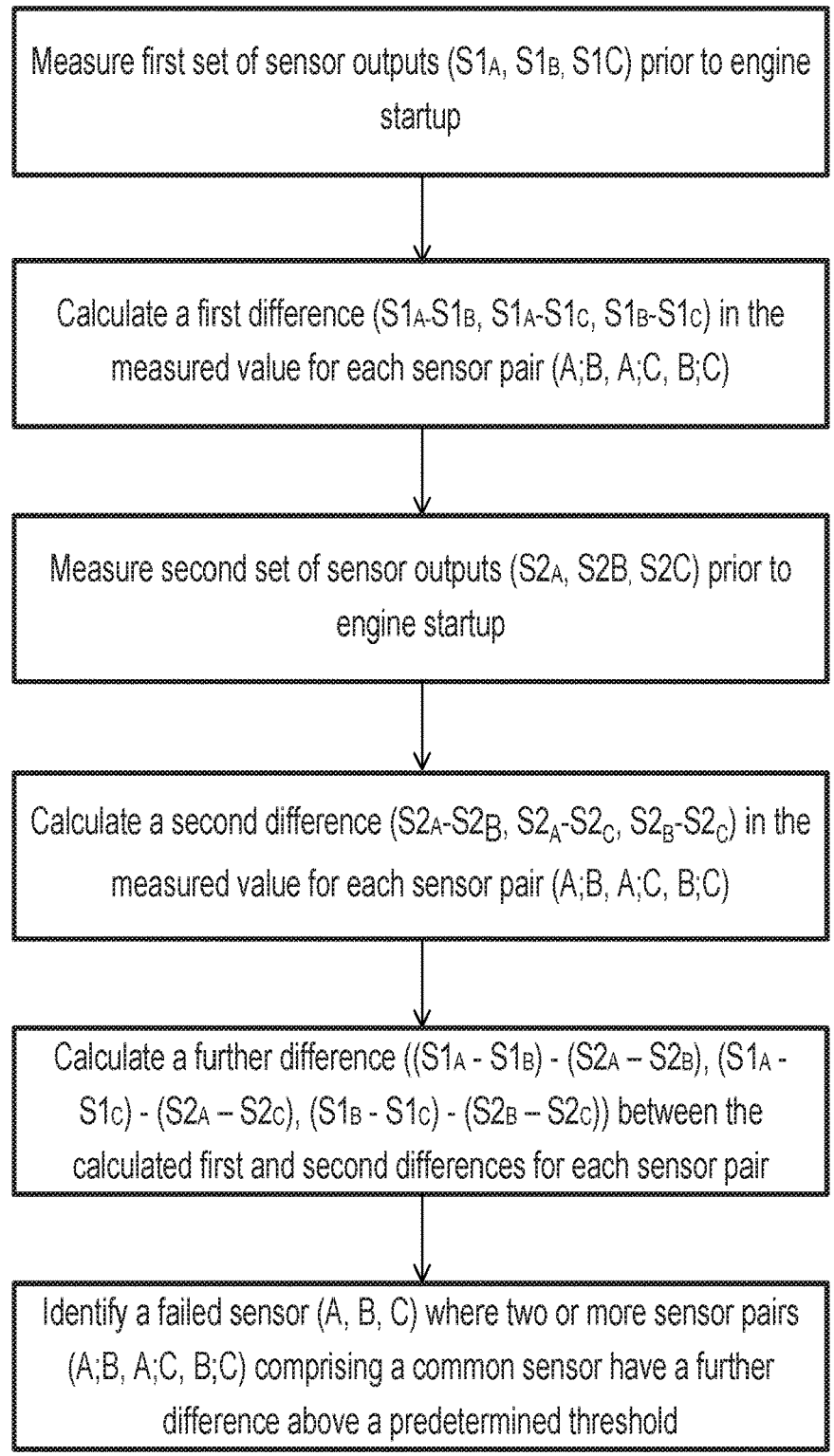
FIG. 2 is a flow diagram illustrating a method of determining a faulty sensor of a sensor array of the engine of FIG. 1.

Referring now to FIG. 2, a method of determining a faulty sensor A, B, C is as follows.

It will be understood that, with three sensors, A, B, C, three sensor pairs A;B, A;C, B;C can be defined. In a first step (a), with the engine 10 in a cold condition, prior to engine start, first signals $S1_A$, $S1_B$, $S1_C$ are input to the FADEC 23 from sensors A, B, C respectively. The signals could be instantaneous signals, or could be averaged over a period of time to reduce the effect of signal noise. This step could be carried out immediately prior to engine start, as the engine 10 electronics are powered up, or during any time when the engine is in an off condition, and is cold (i.e. heat from engine running has dissipated). A difference between the first signals $S1_A$, $S1_B$, $S1_C$ of each sensor pair A;B, A;C, B;C is then calculated, i.e. $(S1_A-S1_B)$, $(S1_A-S1_C)$, and $(S1_B-S1_C)$, and stored in a register.

In a second step (b), a period of time T is allowed to lapse, and again, with the engine 10 in a cold condition, prior to engine start, second signals $S2_A$, $S2_B$, $S2_C$ are input to the FADEC 23 from sensors A, B, C respectively. Typically, the engine is operated in between the first and second measurements, with the second measurement being taken after one or more engine cycles, prior to engine startup. Again, a difference between the signals of each sensor pair A;B, A;C, B;C is then calculated, i.e. $(S2_A-S2_B)$, $(S2_A-S2_C)$, and $(S2_B-S2_C)$.

In a third step (c), a further difference between the calculated first and second differences for each sensor pair A;B, A;C, B;C is calculated. For example, a further difference of the first sensor pair A;B is calculated by $(S1_A-S1_B)-(S2_A-S2_B)$, a further difference of the second sensor pair A;C is calculated by $(S1_A-S1_C)-(S2_A-S2_C)$, and a further difference of the third sensor pair B;C is calculated by $(S1_B-S1_C)-(S2_B-S2_C)$.

From these differences, in a fourth step (d) a faulty sensor can be identified by identifying a sensor A, B, C which is common to two or more sensor pairs A;B, A;C, B;C which are found to have further differences in step (c) that are above a predetermined threshold. For example, where the further difference for the sensor pair A;C differs by a value greater than a predetermined threshold, and the further difference for the sensor pair B;C differs by a value greater than the predetermined threshold, but the further difference for the sensor pair A;B does not differs by a value greater than the predetermined threshold, then it can be deduced that the third sensor C is faulty, while the other two are functional, since both the sensor pairs having a further difference greater than the predetermined threshold comprise measurements from sensor C.

Consequently, the FADEC 23 can continue to operate the engine 10 on the basis of measurements from the remaining, non-faulty sensors A, B. A value of the pressure normally sensed by sensor C could be synthesised form other measurements of the engine. A signal may be provided indicating that the third sensor C is faulty, which can be repaired or replaced at the next opportunity. The engine 10 may be operated in accordance with a more conservative schedule. Alternatively, the faulty sensor can be recalibrated using the data from the above method. For example, where the faulty sensor C is determined to have a difference to sensor A and B of 10% lower than value sensed by sensors A and B, then FADEC 23 is configured to increase the pressure values provided by sensor C by 10% before acting on them. Alternatively, where the faulty sensor C is determined to have a difference to sensor A and B of 10 Pascals lower than value sensed by sensors A and B, then FADEC 23 is configured to increase the pressure values provided by sensor C by 10 Pascals before acting on them.

The following illustrates a worked example. Table 1 below illustrates example pressure readings from the first, second and third pressure sensors A, B, C from the first set of measurements S1 of step (a), and the second set of measurements S2 of step (b):

|    | A   | B   | C   |
|----|-----|-----|-----|
| S1 | 1.0 | 1.4 | 1.2 |
| S2 | 1.1 | 1.5 | 1.5 |

As can be seen from the above, the absolute pressure readings from each of the sensors A, B, C fluctuates between the first and second measurements, due to differences in atmospheric pressure during the different measurements, for example due to different atmospheric conditions, or to the aircraft being in different locations. However, the above method can be used to determine that pressure sensor C is faulty, since, in this case, $((S1_A-S1_B)-(S2_A-S2_B))=0$, $((S1_A-S1_C)-(S2_A-S2_C))=0.2$, and $((S1_B-S1_C)-(S2_B-S2_C))=0.2$. It can be seen that, of the three sensor pairs A;B, A;C, A;C, the further difference is non-zero for the two pairs comprising sensor C. Where the threshold is 0.2 or less in this example, sensor C would be identified as being faulty, and action can accordingly be taken.

It will be understood more than three sensors can be employed, with the number of sensor pairs being equal to:

$$T_n = \frac{n!}{(2(n-2)!}$$

Where $T_n$ is the number of sensor pairs, and n is the number of sensors in the array.

For example, where there are four sensors A, B, C, D, there will be six sensor pairs: A; B, A; C, A; D, B; C, B; D, C; D. The below shows a worked example for a system comprising four sensors:

|    | A   | B   | C   | D   |
|----|-----|-----|-----|-----|
| S1 | 1.0 | 1.3 | 1.1 | 1.1 |
| S2 | 1.5 | 1.8 | 1.6 | 1.1 |

In this case, if the threshold value is again taken to be 0.2, sensor D can be determined to have failed, since $((S1_A-S1_D)-(S2_A-S2_D))=0.3$, and $((S1_B-S1_D)-(S2B-S2_D))=0.5$, whereas $((S1_A-S1_B)-(S2A-S2_B))=0$ and $((S1_A-S1_C)-(S2A-S2C)=0$ for example. Consequently, the sensor pairs having a further difference above the threshold value both include D, whereas the further difference of the other sensor pairs is zero, or is at least below the threshold.

As can be seen, the drift of D in this case is +0.5. Consequently, the FADEC can continue to utilise sensor readings from D, by subtracting 0.5 from the readings provided by the sensor, thereby recalibrating the sensor.

It will also be understood that more than two measurements S1, S2 can be made, with the comparison being made between any two measurement sets. Consequently, drift can be measured over time and calculated for any sensor. By extrapolating drift, a determination can made as to when the sensor error will exceed a predetermined threshold value.

The above method could also be used to determine a faulty temperature sensor in place of a faulty pressure sensor, in a similar manner to the above described process. However, temperatures at different locations on the engine may be expected to vary after engine shutdown. Consequently, where the sensors comprise temperature sensors, the sensors may be co-located. Alternatively, the method may be used where the aircraft has been located in a known temperature environment for a sufficiently long period of time for components of the engine to cool to the same temperature.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of determining a faulty sensor of a sensor array of a gas turbine engine (10), the sensor array comprising at least first, second and third sensors (A, B, C), the method comprising the steps of:
   a. measuring a first set of sensor outputs ($S1_A$, $S1_B$, $S1_C$) prior to engine startup from each sensor (A, B, C), and calculating a first difference ($S1_A-S1_B$, $S1_A-S1_C$, $S1_B-S1_C$) in the measured value for each sensor pair (A; B, A;C, B;C);
   b. after a period of time, measuring a second set of sensor outputs ($S2_A$, $S2_B$, $S2_C$) prior to engine startup from each sensor (A, B, C), and calculating a second difference ($S2_A-S2_B$, $S2_A-S2_C$, $S2_B-S2_C$) in measured value for each sensor pair (A;B, A;C, B;C);
   c. calculating a further difference $((S1_A-S1_B)-(S2_A-S2_B)$, $(S1_A-S1_C)-(S2_A-S2_C)$, $(S1_B-S1_C)-(S2_B-S2_C))$ between the calculated first and second differences for each sensor pair (A;B, A;C, B;C); and
   d. identifying a failed sensor (A, B, C) where two or more sensor pairs (A;B, A;C, B;C) comprising a common sensor (A, B, C) have a further difference above a predetermined threshold.

2. A method according to claim 1, wherein each of the first, second and third sensors comprises a strain gauge transducer, and is configured to sense one of temperature and pressure.

3. A method according to claim 1, wherein each of the sensors is a redundant sensor configured to sense the same pressure or temperature when the engine is running.

4. A method according to claim 1, wherein each of the sensors is located at a different location on the engine, and configured to sense a different engine pressure or temperature when the engine is running.

5. A method according to claim 4, wherein each sensor is located at a different compressor stage and/or turbine stage.

6. A method according to claim 1, wherein the method comprises recalibrating the faulty sensor in accordance with the further difference determined in step c.

7. A sensor fault detection system of a gas turbine engine, the system comprising:
  a sensor array comprising first, second and third pressure and/or temperature sensors (A, B, C); and
  a controller configured to:
  (a) measure a first set of sensor outputs ($S1_A$, $S1_B$, $S1_{3C}$) prior to engine startup from each sensor (A, B, C), and calculate a first difference ($S1_A$–$S1_B$, $S1_A$–$S1_C$, $S1_B$–$S1_C$) in the measured value for each sensor pair (A;B, A;C, B;C);
  (b) after a period of time, measure a second set of sensor outputs ($S2_A$, $S2_B$, $S2_C$) prior to engine startup from each sensor (A, B, C), and calculate a second difference ($S2_A$–$S2_B$, $S2_A$–$S2_C$, $S2_B$–$S2_C$) in measured value for each sensor pair (A;B, A;C, B;C);
  (c) calculate a further difference (($S1_A$–$S1_B$)–($S2_A$–$S2_B$), ($S1_A$–$S1_C$)–($S2_A$–$S2_C$), ($S1_B$–$S1_C$)–($S2_B$–$S2_C$)) between the calculated first and second differences for each sensor pair (A;B, A;C, B;C); and
  (d) identify a failed sensor (A, B, C) where two or more sensor pairs (A;B, A;C, B;C) comprising a common sensor have a further difference above a predetermined threshold.

8. A system according to claim 7, wherein the controller comprises a FADEC of a gas turbine engine.

* * * * *